US007735442B2

(12) United States Patent
Richter

(10) Patent No.: US 7,735,442 B2
(45) Date of Patent: Jun. 15, 2010

(54) METHOD AND DEVICE FOR PRODUCING A BOAT-TYPE BODY OF A WATER SPORT DEVICE

(76) Inventor: Günter Richter, Johannistal 12, 57610 Altenkirchen (DE)

( * ) Notice: Subject to any disclaimer, the term of this patent is extended or adjusted under 35 U.S.C. 154(b) by 43 days.

(21) Appl. No.: 11/793,111

(22) PCT Filed: Dec. 22, 2005

(86) PCT No.: PCT/EP2005/057070

§ 371 (c)(1),
(2), (4) Date: Jun. 16, 2007

(87) PCT Pub. No.: WO2006/069954

PCT Pub. Date: Jul. 6, 2006

(65) Prior Publication Data

US 2008/0105189 A1 May 8, 2008

(30) Foreign Application Priority Data

Dec. 30, 2004 (DE) ........................ 10 2004 063 561

(51) Int. Cl.
*B63B 35/00* (2006.01)
(52) U.S. Cl. ........................................ 114/347; 114/357
(58) Field of Classification Search ................. 114/357, 114/347
See application file for complete search history.

(56) References Cited

U.S. PATENT DOCUMENTS

| 4,681,060 | A | | 7/1987 | Masters et al. | |
|---|---|---|---|---|---|
| 4,980,112 | A | | 12/1990 | Masters et al. | |
| 5,275,121 | A | | 1/1994 | Hand et al. | |
| 5,331,915 | A | | 7/1994 | Snyder et al. | |
| 5,755,311 | A | * | 5/1998 | Younessian et al. | 190/114 |
| 6,292,990 | B1 | * | 9/2001 | Iseki et al. | 29/91.1 |
| 6,314,905 | B1 | * | 11/2001 | Herbein et al. | 114/356 |
| 6,874,442 | B1 | * | 4/2005 | McDonough | 114/347 |
| 2002/0109256 | A1 | * | 8/2002 | Sellepack | 264/151 |

FOREIGN PATENT DOCUMENTS

CA 2 404 042 3/2003

* cited by examiner

*Primary Examiner*—Stephen Avila
(74) *Attorney, Agent, or Firm*—Friedrich Kueffner

(57) ABSTRACT

The invention relates to a method and to a device for producing a boat-type body (10) of a water sport device. According to the invention, a rotating frame (12), which is pre-formed about an access opening of the boat-like body (10), is arranged on an inner side of a negative mould. The outer shape of the boat-type body (10) is predetermined, essentially, by the innerside of the negative mould. The boat-like body (10) is produced in the inner side of the mould by means of a thermoplastic shaping method. During the shaping process, at least one part of the surface of the rotating frame (12) is in contact with the boat-like body (10) which is formed by the thermoplastic shaping method. The invention also relates to a water sport device.

17 Claims, 8 Drawing Sheets

METHOD AND DEVICE FOR PRODUCING A BOAT-TYPE BODY OF A WATER SPORT DEVICE

BACKGROUND OF THE INVENTION

1. Field of the Invention

The invention concerns a method and a device for producing the hull of a piece of water sports equipment. The hull is produced by a thermoplastic molding process. The invention also concerns a piece of water sports equipment.

2. Description of the Related Art

Numerous plastic products are inexpensively produced from thermoplastics by thermoplastic molding processes such as the blow molding process, the rotational molding process, the twin sheet molding process, or the deep drawing molding process. A blow molding process has the advantage over a rotational molding process, for example, that it is less expensive to carry out and can achieve better material properties of the blow molded product. However, especially in the case of boat hulls, openings and areas around openings cannot be molded as desired, and therefore specific requirements cannot always be satisfactorily met.

In addition, there is the problem that, due to the essentially uniform wall thickness of thermoplastically molded boat hulls, it is not possible to construct areas in the hull that have any desired degree of stability. For example, areas in which a relatively large force is introduced into the hull are finished by subsequently welding additional material onto the hull in these areas or by mounting additional elements. Examples of areas of this description include especially grips provided on the hull or holes provided in the hull for fastening a line. In other areas in which instability generally does not lead directly to destruction of the hull, this instability is often accepted for cost reasons.

In the prior art, in the hull of a piece of water sports equipment, e.g., the hull of a canoe, grip projections and bilge plug formations are subsequently reinforced by the application of additional material. Especially in kayaks, coaming is provided around the cockpit opening, and a spray cover can then be attached to the coaming. This coaming is either reinforced by installing stiffening ribs or is intentionally left unstable. However, if the coaming is unstable, the spray cover cannot be reliably prevented from slipping off. Furthermore, additional molded parts must be subsequently mounted and fastened for the installation of a back support and to realize leg supports.

SUMMARY OF THE INVENTION

The objective of the invention is to specify a method and a device by which the hull of a piece of water sports equipment can be more or less completely produced by a thermoplastic molding process, so that only a relatively small amount of finishing work is necessary to complete the hull.

In accordance with a first aspect of the invention, this objective is achieved by a method with the features of claim 1. Advantageous modifications of the invention are specified in the dependent claims.

The method of the invention for producing the hull of a piece of water sports equipment makes it possible to reinforce the opening area around the cockpit opening of the thermoplastically molded hull by the frame in a simple way and/or to realize projections that cannot be produced solely by the thermoplastic molding process. This makes it possible to improve the range of applications and the quality of the hull produced in this way, and finishing work to finish the complete boat is reduced by means of premolded frames. Moreover, a hull of this type can be produced inexpensively.

A second aspect or the invention concerns a device for producing the hull of a piece of water sports equipment. This device comprises a negative mold, on the inner surface of which a peripheral frame is arranged, such that the inner surface of the negative mold essentially predetermines the outer shape of the hull. The device also includes an arrangement which forms the hull on the inner surface of the mold by means of a thermoplastic molding process, so that the hull is at least in partial contact with the peripheral frame, thereby causing the hull and the peripheral frame to be joined in such a way that the frame, which is joined with the hull, extends around the cockpit opening of the hull.

A device of this type in accordance with the invention makes it possible to produce a reliable and very durable connection at the point of contact between the hull and the frame. A device of this type eliminates the need for subsequent joining of the hull with stiffening ribs. Hulls that are reinforced and/or stiffened by the frame can be produced in a simple way with the use of this device. Furthermore, almost any desired projections of the area around the cockpit opening can be easily produced, and other functional elements can be realized in this way. With the use of this device, hulls of this type can be produced simply and inexpensively when a mold is used in which the frame can be easily arranged and fixed in the correct position. This simplifies the handling of the mold and the frame.

A third aspect of the invention concerns a method for producing the hull of a piece of water sports equipment in which a preform with at least two layers is produced, such that the first layer consists of a material of a first color, and the second layer consists of a material of a second color. The preform is placed in the mold and molded by a thermoplastic molding process in such a way that at least the outer layer of the upper part of the hull has the first color and at least the outer layer of the lower part of the hull has the second color.

This method allows simple production of a two-color hull of a piece of water sports equipment. Operations for joining an upper part of the hull and a separate, lower part of the hull are eliminated. Possible points of leakage are prevented by the elimination of a joint between the upper and lower parts of the hull. Furthermore, a two-color hull can be produced simply, quickly, and inexpensively by the method of the invention. Subsequent coating of the hull to give it a certain colored appearance is no longer absolutely necessary.

A fourth aspect of the invention concerns a piece of water sports equipment with an elongated hull, which is joined at least with a frame by a molding operation for molding the hull. A piece of water sports equipment of this type can be systematically stiffened or stabilized by the frame in the area around the cockpit opening. This constitutes a simple means of meeting requirements for greater stability in this area. By joining the frame with the hull during the molding operation, a very strong and durable connection is produced. After the molding operation, the frame is joined with the hull as a single piece.

By contrast, connections between the hull and a frame that are produced at a later time are not as strong and not as durable, since, depending on the type of joining, they do not allow joining over a large surface area or a full-surface connection between adjoining areas of the frame and the hull, or they impair the material stability and material properties of the hull or the frame, for example, by separation. Furthermore, when these types of joining are used, problems arise with the clean formation of marginal areas of a frame placed on the hull, since either no joint is present in the marginal areas or a welding seam and protruding joining material are visible between the frame and the hull.

The present invention will now be explained in greater detail with reference to the preferred embodiments that are illustrated in the drawings and described on the basis of specific terminology. However, it should be noted that the scope of the invention is not limited to these specific embodiments, since changes and other modifications of the illustrated devices and of the methods and applications of the invention other than those shown here are regarded as standard present or future technical knowledge of one skilled in the art.

BRIEF DESCRIPTION OF THE DRAWINGS

The drawings show specific embodiments of the invention, namely.

DETAILED DESCRIPTION OF THE PREFERRED EMBODIMENTS

Figure 1:
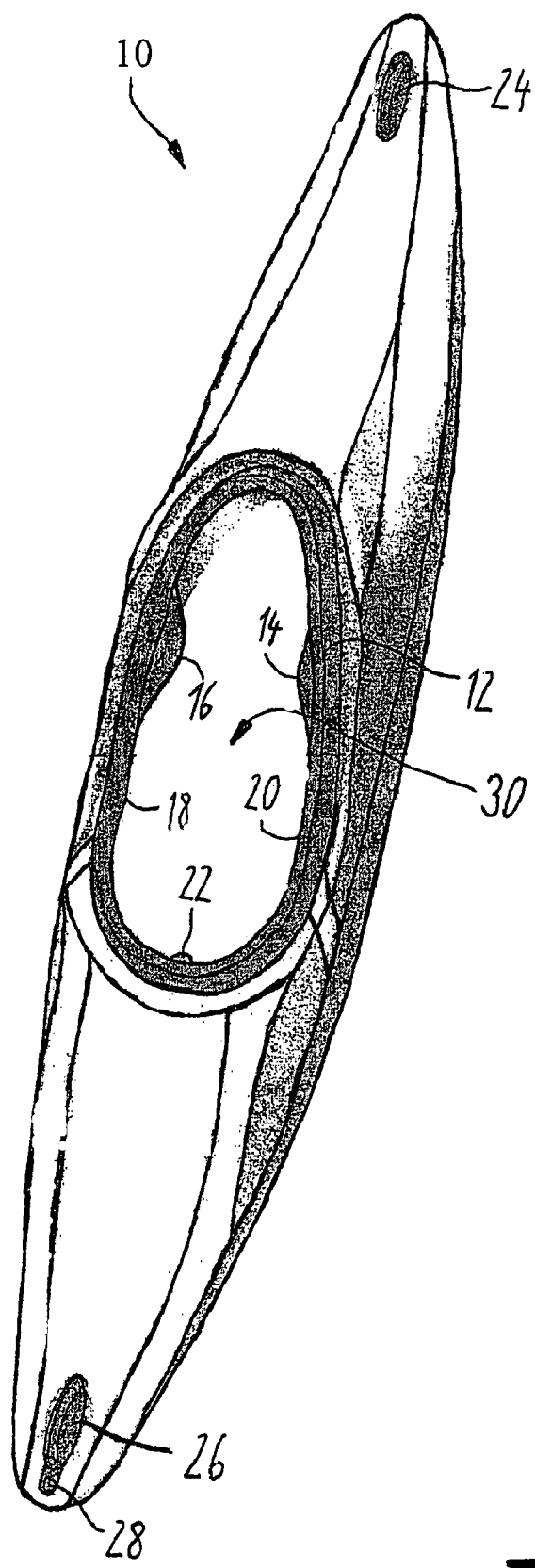
FIG. 1 shows a top view of a hull of a kayak in accordance with the invention.

FIG. 1 shows a hull 10 of a kayak in accordance with the invention, which is produced from a thermoplastic by a blow molding process. The hull 10 has a coaming frame 12 with leg support elements 14, 16 formed on it, with seat adjustment elements 18, 20 formed on it, and with an element 22 for fixing the back support, which is integrated in the coaming frame 12. In addition, the hull 10 is provided with carrying handles 24, 26 and a hole 28 for receiving a bilge plug. The handle 24, the handle 26, which is formed as a single part with the bilge plug hole 28, and the coaming frame 12 are already positioned in the blow mold before the blowing operation. The blow mold preferably has recesses into which the handle 24, the coaming frame 12, and the handle 26 with the bilge plug hole 28 are inserted. These elements 12, 24, 26 inserted in the recesses are preferably fixed in place by suitable means. These inserted elements 12, 24, 26 are preferably preheated in the blow mold before the blowing operation. A preform is then placed in the blow mold and blown, so that an essentially uniformly thick blow molded plastic layer forms on the inside wall of the blow mold and around the elements 12, 24, 26 inserted in the blow mold.

The element that has been blow molded in this way is in contact with at least one region of the surface of the elements 12, 24, 26 during the molding operation, so that at least this contacting surface region of these elements 12, 24, 26 is intimately joined, preferably by fusion, with the blow molded part formed in the blow molding process. This fusion process is promoted especially by the preheating of the inserted elements 12, 24, 26. The degree of fusion between the blow molded element and the elements 12, 24, 26 inserted in the blow mold can be adjusted by the preheating temperature. This makes it possible to form elements 12, 24, 26 on the hull 10, which could not otherwise be formed at all or could not be produced with the desired characteristics solely by the blow molding operation.

Figure 6:
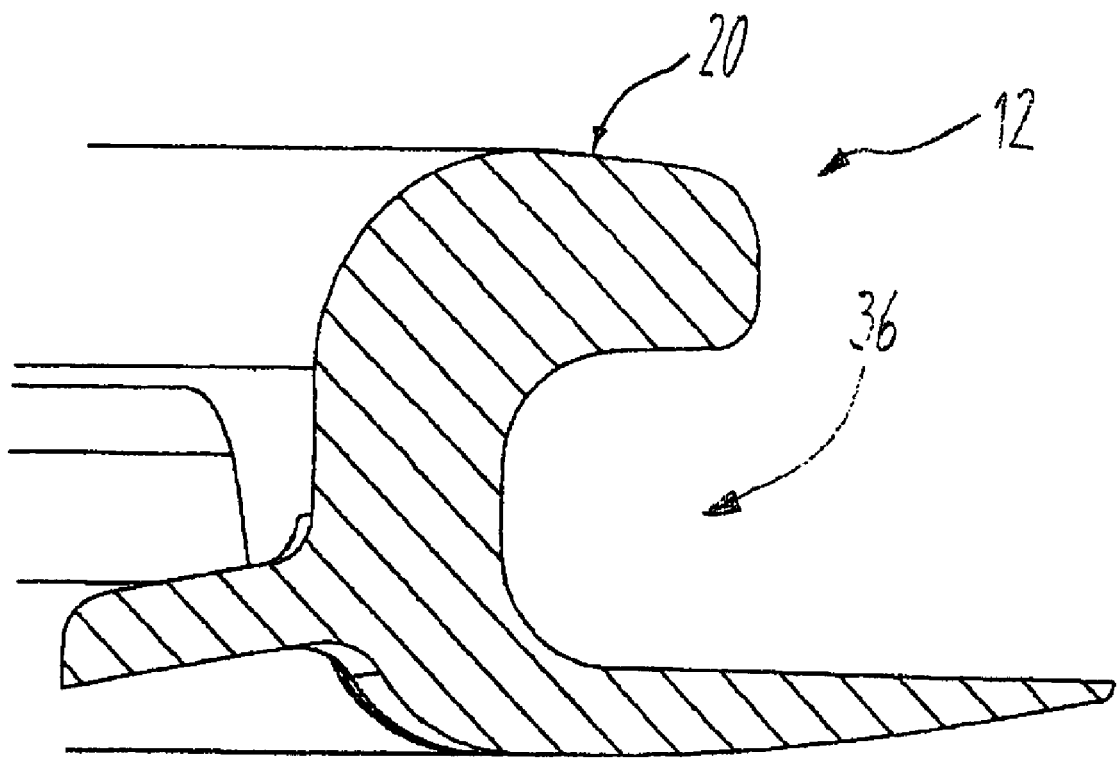
FIG. 6 shows a cross-sectional view of the coaming frame according to FIG. 4 or FIG. 5 along sectional line A-A in FIG. 5.

The coaming frame 12 is arranged around a cockpit opening 30 of the hull 10 and is provided with a lateral peripheral groove 36, which is shown in the cross-sectional view of the coaming frame 12 in FIG. 6. To seal the cockpit opening 30 against the part of a person's body that extends out of the cockpit opening 30, a peripheral spray cover, which is also referred to as a tarpaulin, is inserted and secured in this groove 36. The tarpaulin is preferably tubular, and one end of the tube is held in the groove 36 by a prestressed rubber ring. At the other end of the tube, another prestressed rubber ring can be provided, which presses this end of the tube against the body extending out of the cockpit opening 30 and thus creates a seal against the body. The shoulder formed above the groove 36 is also known as the coaming.

The extruded section of the coaming frame 12 is produced by the so-called extrusion molding process, and the handles 24, 26 are produced by an injection molding process. The coaming frame 12 and the elements 24, 26 are preferably made of the same thermoplastic material as the hull 10, for example, a polyethylene material. The coaming frame 12 is preferably formed as a solid profile, which makes it possible to achieve a high degree of stiffness in the area around the cockpit opening 30. The extrusion molding process and the injection molding process allow a high degree of freedom of design of the elements 12, 24, 26 produced by these processes. All of the elements of the hull 10 that are subject to or could be subject to large forces are preferably produced by the extrusion molding process, the injection molding process, or some other suitable molding process and are inserted in the blow mold as inserts. In addition, the extrusion molding process makes it possible to form additional elements directly on or in the coaming frame 12, such as leg support elements 14, 16, seat adjustment elements 18, 20, and the back support fixing element 22.

In the prior art, these elements 14 to 22 must be produced by complicated methods as single parts and then individually mounted on the blow molded hull 10 by relatively complicated production methods. However, the joining of such elements 14 to 22 with the hull is problematic, since especially the hull can be damaged by the placement of joining elements, such as screws or rivets, by the "dissolving" of the hull with adhesive, or by the material changes that occur during subsequent welding of the hull 10 with the additional elements 14 to 22. By contrast, the method of the invention for producing the hull 10 is much more cost-effective, and the quality of the hull 10 and the useful properties of the complete boat are also significantly improved.

A bilge hole must be provided in the hull 10 to allow water that has entered the hull 10 to be removed. The bilge hole 28 is preferably located at one end of the hull 10 and provides a simple means of removing water present in the hull 10. However, the ends of suitable hull molds are usually poorly accessible, since they taper to a point. As a result, in the prior art, it is relatively difficult and complicated to introduce material in these end regions from the inside to reinforce a blow molded hull for the purpose of constructing a reinforced bilge hole 28 into which an ordinary bilge plug can be inserted to reliably plug the bilge hole 28.

In accordance with the invention, the handle 26 and the bilge hole 28 are produced as a single part by the injection molding process. As has already been mentioned, this part is inserted in the blow mold before the blowing operation, so that this part is also fused and thus welded with the blow molded part during the blowing operation.

Figure 2:
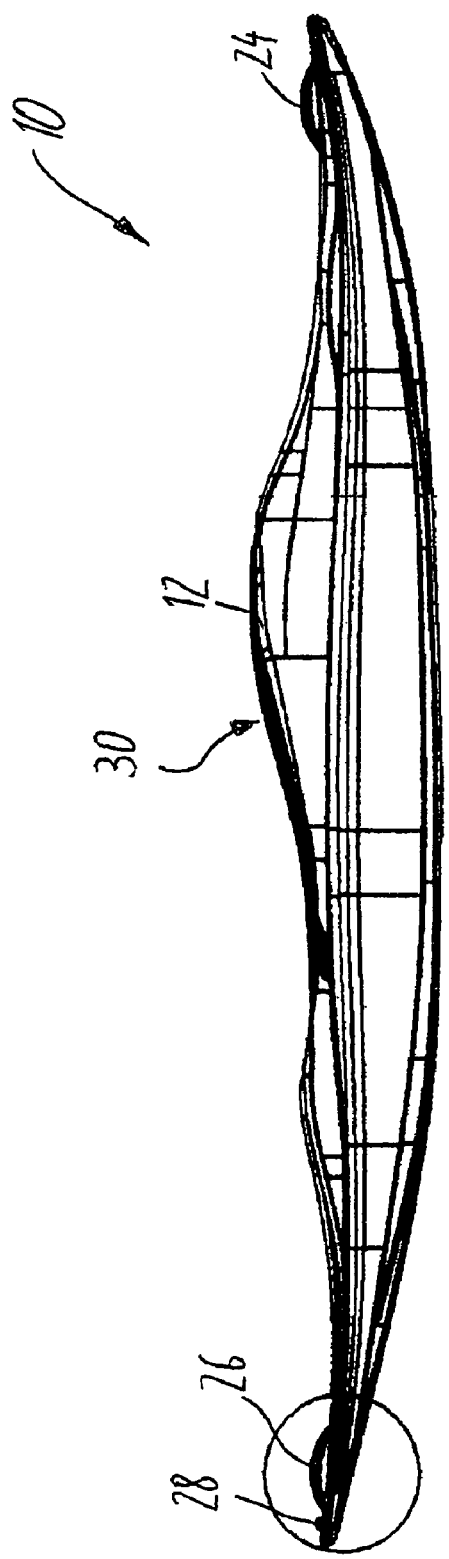
FIG. 2 shows a scaled-down side view of the kayak of FIG. 1.
Figure 3:
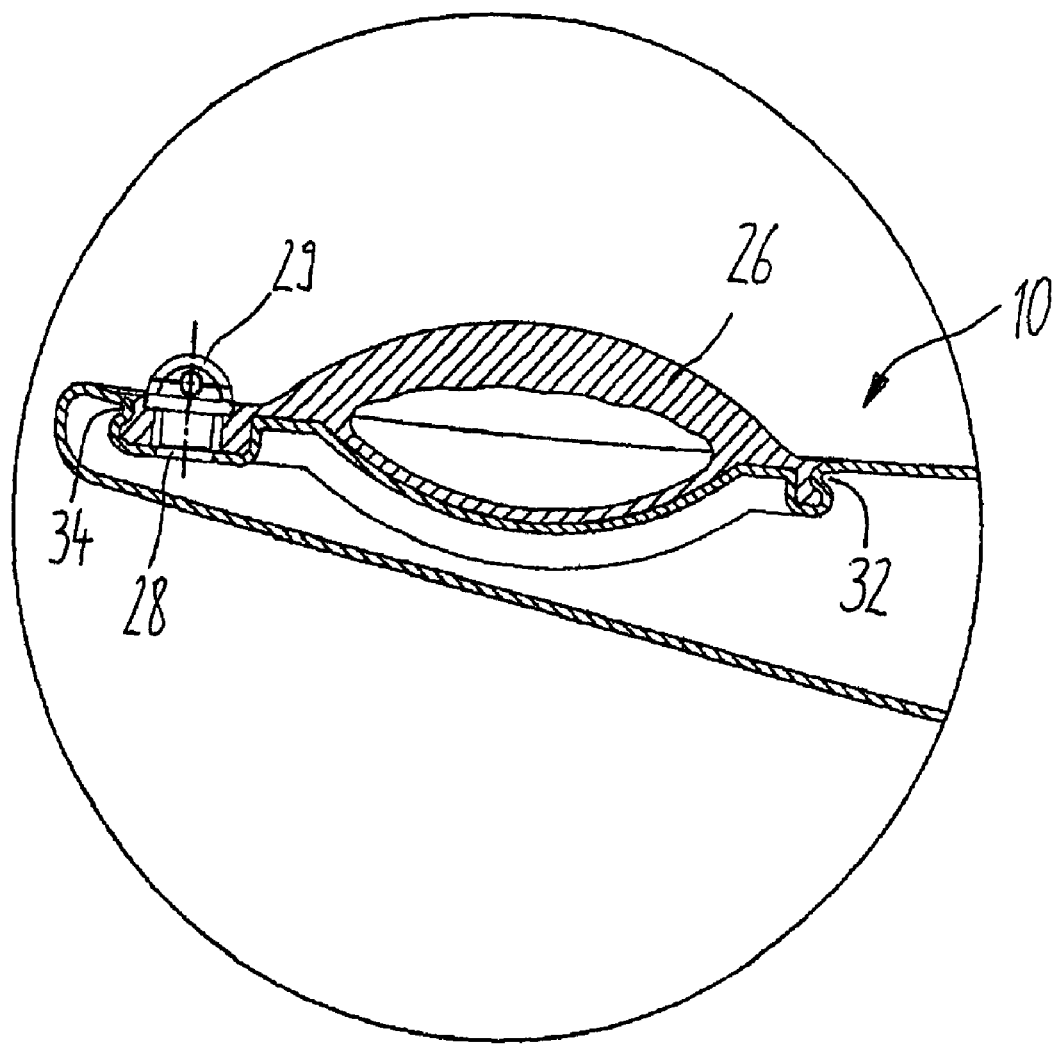
FIG. 3 shows an enlarged view of a longitudinal section through the rear end region of the kayak according to FIG. 2.

FIG. 2 shows a side view of the hull 10 in FIG. 1. Elements that are the same have the same reference numbers. FIG. 3 is an enlarged sectional view that shows the detail of the region within the circle in FIG. 2. The hull produced in the blow molding process is shown in FIG. 3 with hatching that runs from upper left to lower right, and the injection molded part with the handle 26 and the bilge hole 28 is shown with hatching that runs from lower left to upper right. The injection molded part has undercut regions 32, 34, which are surrounded by the blow molded part, so that additionally or alternatively to the welding of the blow molded part with the injection molded part, a positive locking connection is produced.

The injection molded part with the handle 26 and the bilge plug hole 28 is thus both intimately joined by the welding of the blow molded element with the injection molded element and is joined by a positive locking connection as a result of the engagement of the blow molded element in the undercut regions 32, 34. FIG. 3 also shows a bilge plug 29, which is inserted in the bilge plug hole 28 to plug it tightly.

Figure 4:
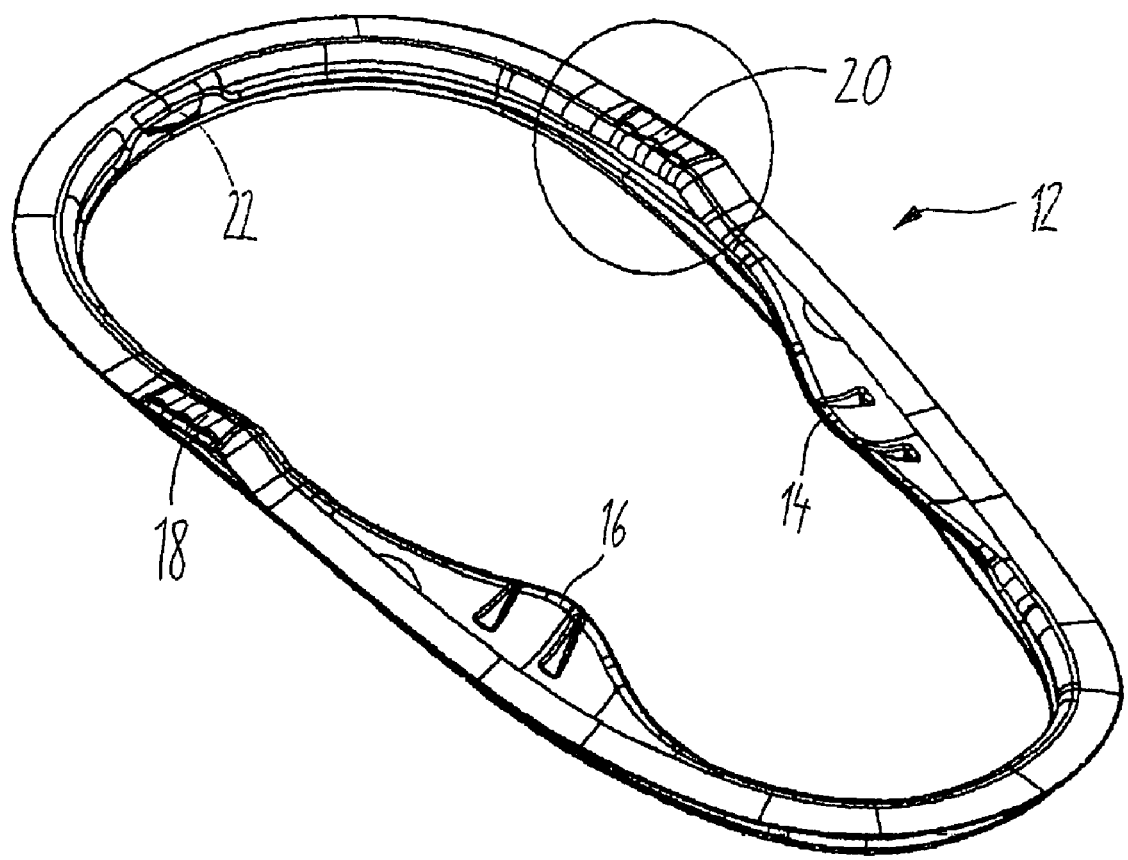
FIG. 4 shows a perspective view of the underside of a prefabricated coaming frame for producing a hull according to FIGS. 1 and 2.

FIG. 4 shows a perspective view of the underside of the coaming frame 12. As mentioned earlier in connection with FIG. 1, the coaming frame 12 forms a stable frame around the cockpit opening 30 and stabilizes the hull 10 around the cockpit opening 30. The back support fixing element 22, the seat adjustment elements 18, 20, and the leg support elements 14, 16 are shown in greater detail in FIG. 4.

Figure 5:
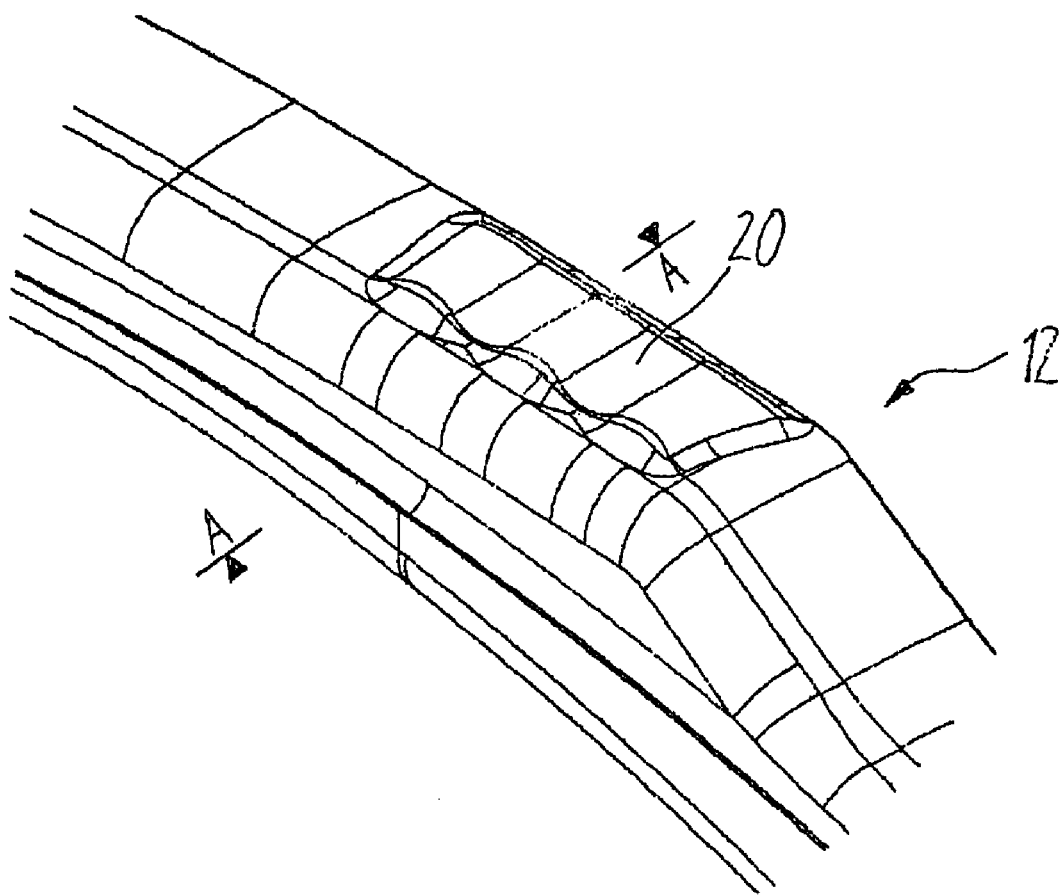
FIG. 5 shows an enlarged view of a segment of the coaming frame according to FIG. 4.

FIG. 5 is a detail drawing of the region of the coaming frame 12 within the circle in FIG. 4. In particular, FIG. 5 shows detail of the formation of the seat adjustment element 18 on the coaming frame 12, in which recesses are visible which serve as grids for positioning and attaching a seat.

FIG. 6 shows a cross-sectional view of the coaming frame 12 in the plane A-A according to FIG. 5, which passes through the seat adjustment element 18 formed on the coaming frame. The coaming frame 12 has a lateral peripheral groove 36 in which, as mentioned earlier, a peripheral water of condensation tarpaulin can engage. As an alternative to the aforementioned prestressed rubber ring, the tarpaulin can also be prevented from slipping out of the groove 36 by means of a cord.

Figure 7:
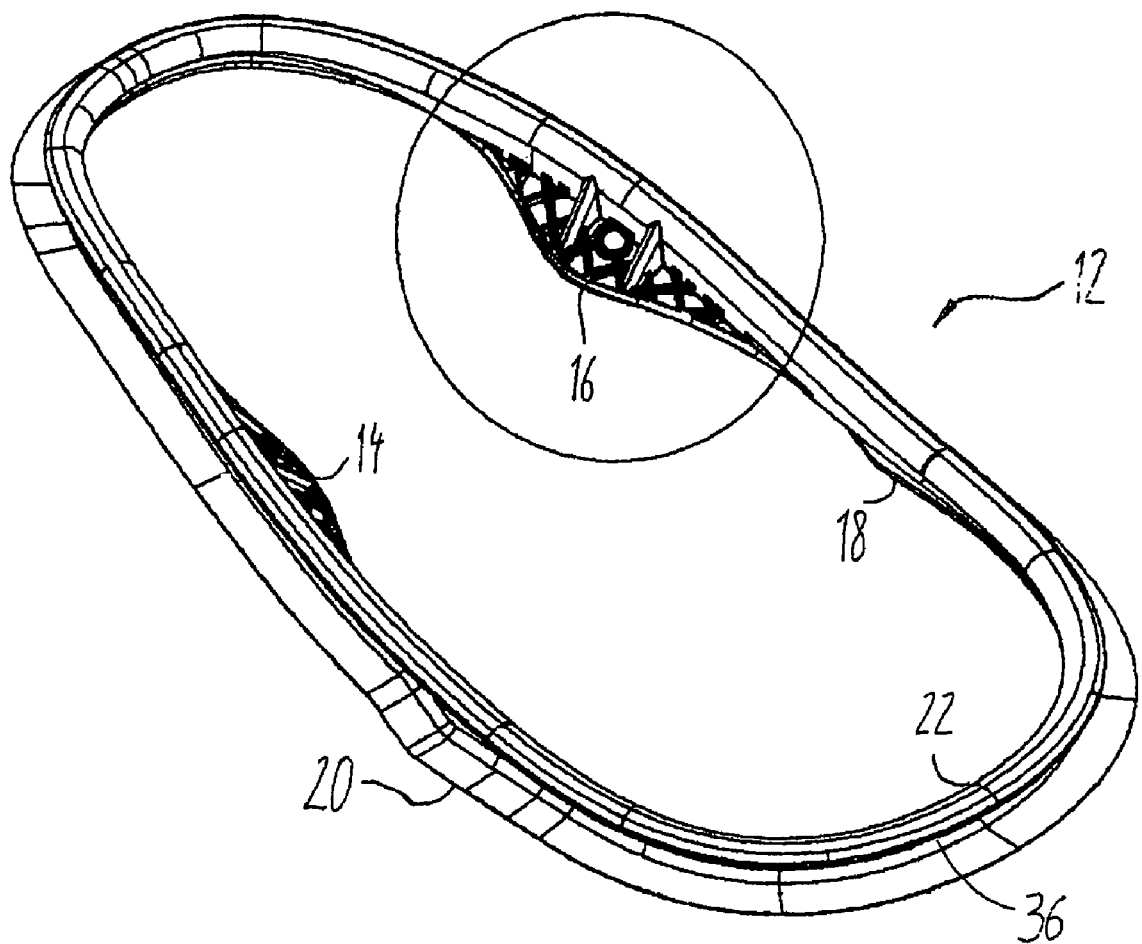
FIG. 7 shows a perspective view of the upper side of the coaming frame according to FIG. 4.
Figure 8:
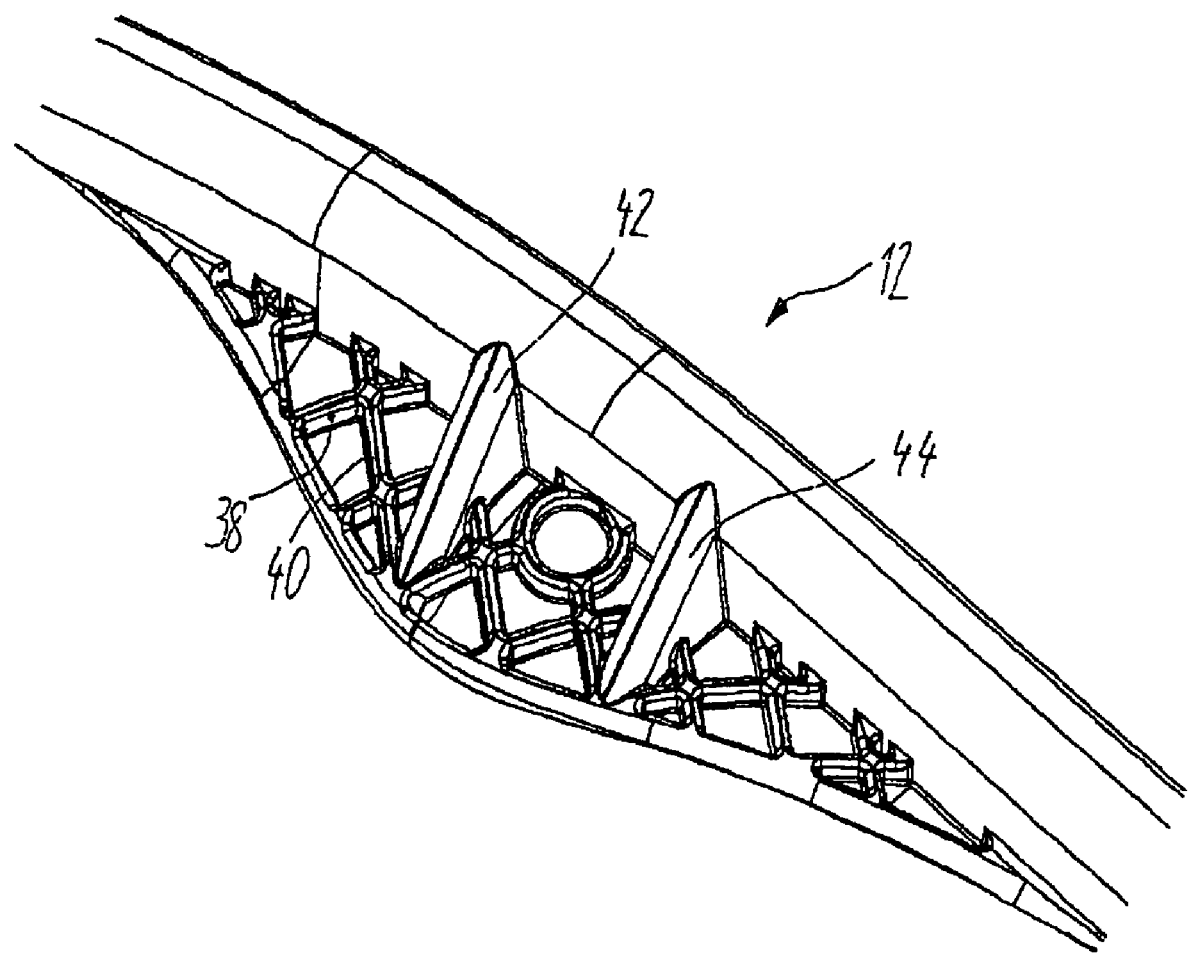
FIG. 8 shows an enlarged view of a section of the coaming frame according to FIG. 7.

FIG. 7 shows a perspective view of the upper side of the coaming frame 12. FIG. 8 shows an enlarged view of the region of the coaming frame 12 within the circle in FIG. 7. This region contains the leg support element 16. The upper side of the leg support elements 14, 16 has reinforcing elements arranged in the form of a grid. Two of these reinforcing elements are labeled 38, 40 in the drawing. In addition, other reinforcing elements 42, 44 are provided, so that the leg support element 16, which extends inward from the coaming frame 12 towards the cockpit opening 30, is prevented from bending, even under the effect of relatively large forces.

The blow molded hull 10 is preferably produced from a preform with at least two layers, such that the first layer of the preform contains a material of a first color, and the second layer contains a material of a second color. The document DE 195 45 441 A1 discloses a preform of this type and a device for producing a preform of this type with at least two layers. The specification contained in the cited document regarding the preform and the method and device for producing this type of preform are herewith incorporated in the present specification by reference.

The preform with at least two layers is inserted in the blow mold in such a way that, after the blowing operation, at least the outer layer of the upper part of the hull 10 has the first color and at least the outer layer of the lower part of the hull 10 has the second color. This makes it possible to produce hulls 10 with at least two colors in a very simple and cost-effective way. Especially in the case of pieces of water sports equipment, the color design of the boat is a deciding factor in the purchase and popularity of a piece of water sports equipment, so that a two-color design of the hull 10 is very advantageous for creating customer interest and thus for selling the piece of water sports equipment. In addition, it is advantageous to provide the outer layer of the lower part of the hull 10 with a dark color and the upper part of the hull 10 with a light color, because the light color absorbs very little solar radiation. On the other hand, contamination with particles present in the water, which are deposited over a long period of time on the lower part of the hull 10 in contact with the water, is not visible with such high contrast on a dark surface.

Alternatively to the blow molding process described in this specific embodiment, other suitable thermoplastic molding processes can be used to form a thermoplastically molded element and at least one additional element, e.g., a rotational molding process, a twin sheet molding process, or a deep drawing molding process.

Although the drawings show preferred embodiments and the preceding specification provides a detailed description of these preferred embodiments, these specific embodiments must be understood to be purely exemplary in nature and are not intended to limit the invention in any way. It should be pointed out that only the preferred embodiments are shown and described, and that all variations and modifications that are presently within the scope of the invention or in the future will be within the scope of the invention are also to be protected.

LIST OF REFERENCE NUMBERS 10 hull
12, 14 leg support elements
16, 18 seat adjustment elements
22 back support fixing element
24, 26 handles
28 bilge hole
29 bilge plug
30 cockpit opening
31 bilge plug
32, 34, 36 undercut
38, 40, 42, 44 reinforcing elements
A-A sectional plane

The invention claimed is:

1. A method for producing the hull of a piece of water sports equipment, the method comprising arranging a pre-molded frame (12) on an inner surface of a negative mold, such that the outer shape of the hull (10) is predetermined by the inner surface of the negative mold; producing the hull (10) on the inner surface of the mold by a thermoplastic molding process; and, during the molding operation, contacting at least part of the surface of the frame (12) with the hull (10) that is being molded by the thermoplastic molding process; wherein a connection is produced between the frame (12) and the hull (10), so that the frame (12) is positioned around a cockpit opening of the hull (10).

2. A method in accordance with claim 1, wherein the frame (12) is a closed peripheral frame (12), which has an outwardly projecting coaming for attaching a spray cover.

3. A method in accordance with claim 1, wherein at least one molded element is formed on the frame (12) and that this molded element is provided as a leg support element (14, 16)

of a person in the hull (10), as a seat adjustment element (18, 20) of a seat mounted in the hull (10), and/or as a back support fixing element (22) of a back support element of the seat.

4. A method in accordance with claim 1, wherein an additional premolded element (24) is arranged in the mold, such that the additional premolded element is a handle (24, 26).

5. A method for producing the hull of a piece of water sports equipment, the method comprising arranging a premolded frame (12) on an inner surface of a negative mold, such that the outer shape of the hull (10) is predetermined by the inner surface of the negative mold; producing the hull (10) on the inner surface of the mold by a thermoplastic molding process; and, during the molding operation, contacting at least part of the surface of the frame (12) with the hull (10) that is being molded by the thermoplastic molding process; wherein a connection is produced between the frame (12) and the hull (10), so that the frame (12) is positioned around a cockpit opening of the hull (10), wherein an additional premolded element (24) is arranged in the mold, such that the additional premolded element is a handle (24, 26), wherein the handle (26) has a base plate, which is joined with the hull (10) by the thermoplastic molding process, where the base plate contains a bilge hole (28), which is tightly plugged by a bilge plug (29).

6. A method in accordance with claim 1, wherein the thermoplastic molding process is a blow molding process, a rotational molding process, a twin sheet molding process, or a deep drawing molding process.

7. A method in accordance with claim 1, wherein, due to the contact during the thermoplastic molding operation, at least one intimately joined connection is produced between the hull (10) and the frame (12)

8. A method in accordance with claim 1, wherein the hull (10) at least partially surrounds the frame (12) and/or the premolded element (24, 26) in such a way that a positive locking connection is produced between the hull (10) and the frame (12) and/or the premolded element (24, 26)

9. A method in accordance with claim 1, wherein the frame (12) and/or the premolded element (12, 24, 26) is preheated before the thermoplastic molding operation.

10. A method in accordance with claim 1, wherein the hull (10) is the hull of a kayak.

11. A method in accordance with claim 3, wherein the frame (12), which includes the molded elements (14, 16, 18, 20, 22) formed on the frame (12) by the frame mold, and/or a premolded element (24, 26) to be joined with the hull (10) is produced by an extrusion molding process or an injection molding process.

12. A method in accordance with claim 1, wherein the hull (10) and the frame (12) and/or the premolded element (24, 26) are produced from the same plastic.

13. A method in accordance with claim 1, wherein the frame (12) and/or the premolded element (12, 24, 26) is inserted in the mold and/or is mounted on the inner surface of the mold.

14. A method in accordance with claim 1, wherein at least part of the outer surface of the hull (10) has a first color and/or the premolded element (12, 24, 26) has a second color that is different from the first color.

15. A method in accordance with claim 1, wherein the hull (10) is produced on the inner surface of the mold by a blow molding process, where a preform is placed in the mold and blown by a blowing operation, and where the frame (12) is at least partially in contact with the blow molded hull (10) formed from the preform in the blow molding process.

16. A method in accordance with claim 15, wherein the hull (10) is formed with at least two layers from two differently colored materials in such a way that a first material, which forms a first surface region of the hull (10), has a color that is different from the color of a second material, which forms a second surface region of the hull (10).

17. A method for producing the hull of a piece of water sports equipment, in which a preform with at least two layers is produced, wherein the first layer consists of a material of a first color, and the second layer consists of a material of a second color, and in which the preform is placed in the mold and molded by a thermoplastic molding process in such a way that at least the outer layer of the upper part of the hull (10) has the first color and at least the outer layer of the lower part of the hull has the second color, wherein a premolded frame (12) and/or another premolded element (24, 26) is introduced into the hull (10) by arranging the premolded frame (12) on the inner surface of a negative mold, such that the outer shape of the hull (10) is predetermined by the inner surface of the negative mold; in which the hull (10) is produced on the inner surface of the mold by a thermoplastic molding process; and in which, during the molding operation, at least part of the surface of the frame (12) is in contact with the hull (10) that is being molded by the thermoplastic molding process; wherein a connection is produced between the frame (12) and the hull (10), so that the frame (12) is positioned around a cockpit opening of the hull (10).

\* \* \* \* \*